United States Patent [19]

Sager

[11] Patent Number: 5,717,883
[45] Date of Patent: Feb. 10, 1998

[54] METHOD AND APPARATUS FOR PARALLEL EXECUTION OF COMPUTER PROGRAMS USING INFORMATION PROVIDING FOR RECONSTRUCTION OF A LOGICAL SEQUENTIAL PROGRAM

[75] Inventor: David J. Sager, Portland, Oreg.

[73] Assignee: Digital Equipment Corporation, Maynard, Mass.

[21] Appl. No.: 495,142

[22] Filed: Jun. 28, 1995

[51] Int. Cl.⁶ .................................................. G06F 9/44
[52] U.S. Cl. ..................... 395/394; 395/706; 395/708; 395/582; 395/800
[58] Field of Search ............................. 395/375, 650, 395/700, 706, 708, 394, 582, 800

[56] References Cited

U.S. PATENT DOCUMENTS

| | | | |
|---|---|---|---|
| 4,847,755 | 7/1989 | Morrison et al. | 395/379 |
| 5,202,975 | 4/1993 | Rasbold et al. | 395/685 |
| 5,396,640 | 3/1995 | Ikenopa et al. | 395/800 |
| 5,421,022 | 5/1995 | McKeen et al. | 395/800 |
| 5,504,914 | 4/1996 | Lai | 395/800 |
| 5,511,172 | 4/1996 | Kimura et al. | 395/582 |

Primary Examiner—Kenneth S. Kim
Attorney, Agent, or Firm—Anne E. Saturnelli; Arthur W. Fisher

[57] ABSTRACT

A computer system with multiple execution units operates by treating a logical program as a tree structure with segments which include several computer instructions. Segments of the tree structure are connected by nodes which represent decisional instructions in the logical program. Serial numbers are assigned to each instruction within each of the tree structure. The instructions and then rearranged into a set of instructions which are no longer linearly dependent. The original serial numbers assigned to each instruction are retained with the instructions after rearrangement. During rearrangement, path information is added to each instruction to indicate its commit point. The serial numbers and path information allow reconstruction of the original set of instructions from the rearranged set of instructions. The path codes represent a path through the tree structure to a particular one of the segments in which all of the instructions in the associated subset will be committed in logical terms. The information added to the rearranged instructions allows several instructions to be executed in parallel while producing the same results as would have been produce had the instructions been executed one at a time by a sequential processor.

20 Claims, 7 Drawing Sheets

LOGICAL PROGRAM

PHYSICAL PROGRAM

```
                STOR      ADDR20, R0
         ADD      R0, R1, R20
SERIAL
  #
  20     LD       ADDR1, R1
  21     ADD      R1, R2, R3
  22     STOR     ADDR2, R3
  23     LD       ADDR3, R5
  24     ADD      R5, R6, R7
  25     STOR     ADDR4, R7
  26     LD       ADDR5, R9
  27     ADD      R9, R10, R11
  28     STOR     ADDR6, R11

STOR     ADDR50, R10
```

LOGICAL PROGRAM

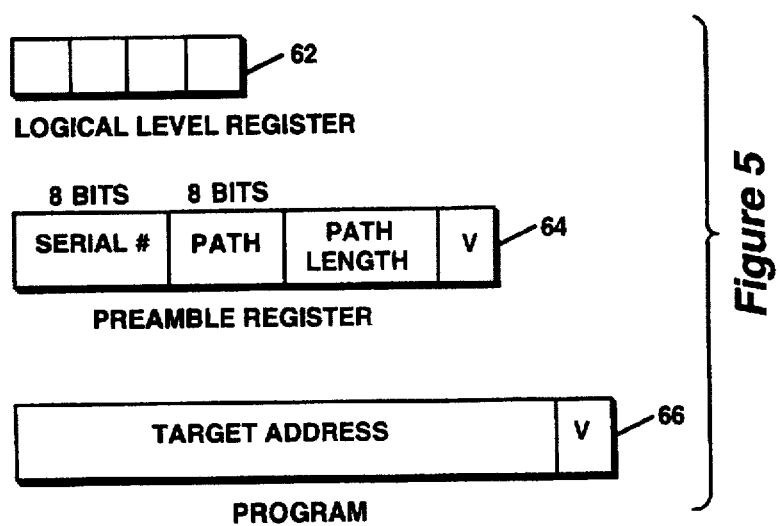
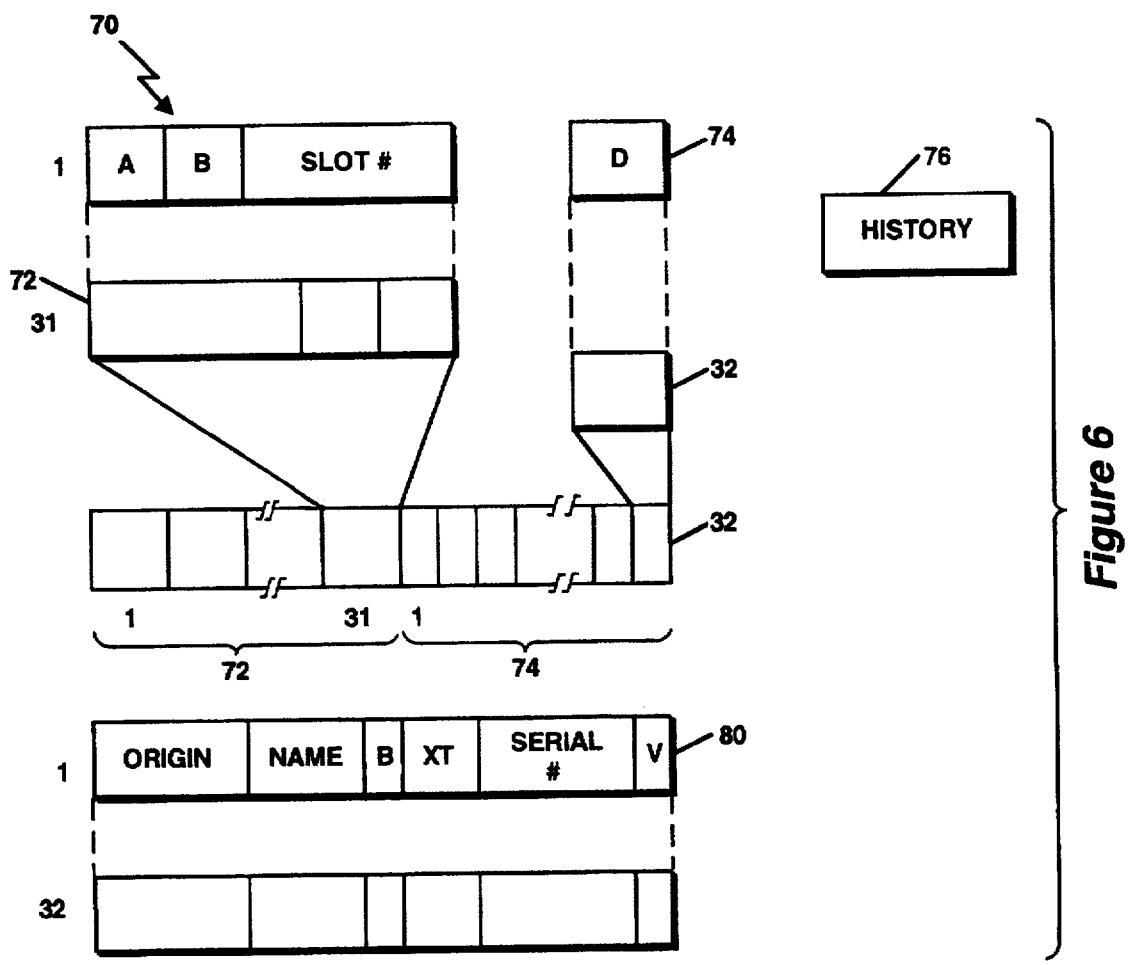

"SEGMENT BRANCH LEFT"

"SEGMENT BRANCH RIGHT"

METHOD AND APPARATUS FOR PARALLEL EXECUTION OF COMPUTER PROGRAMS USING INFORMATION PROVIDING FOR RECONSTRUCTION OF A LOGICAL SEQUENTIAL PROGRAM

BACKGROUND OF THE INVENTION

This invention relates generally to computer systems and more particularly to parallel processing of computer program instructions.

As it is known in the art, computer systems generally include at least one central processing unit (CPU), a memory, and some type of mass storage device such as a disk drive. A typical computer operates by reading and executing program instructions which have been read from a mass storage device and placed in the memory. Through a combination of user interaction and program execution, the user is typically provided a desired result.

A computer program is a series of instructions which are usually written by a person skilled in the art of computer programming. The programs are typically written in a so called high level programming language such as "C", "Pascal", or "FORTRAN". High level programming languages are languages whose instructions are easily read and understood by a person with training in the particular language. Once a program has been written, it is then processed by a so called compiler.

A compiler, which is written for one of several high level programming languages, reads the high level program instructions and converts them into so called machine instructions. Machine instructions are instructions that are readable and executable by a central processor (CPU). When a user invokes a program, the CPU will cause the compiled instructions to be read into the memory and executed.

Most computer programs which are executed on typical computer systems require that the operations be executed in a generally serial fashion. In other words, the program must be executed one instruction after another until the desired result is obtained. The exception occurs when, during the course of execution, an instruction causes a so called, jump, or exception.

A branch occurs when a section of instructions needs to be skipped or when a section of instructions located in a different part of the program needs to be executed. An example of a situation where a section of code will be skipped is illustrated by the so called "goto" programming step. The "goto" is used to execute a set of instructions which does not immediately succeed the instruction which has just been executed. The instructions beginning at the destination of the goto instruction are executed in serial fashion.

A typical central processing unit includes several processing stages which make up a so called pipelined system. The processing stages normally associated with a typical central processing unit include a so called Instruction cache (I-cache), one or more so called Execution boxes (E-box), a so called Cache box (C-box), as well as various logic circuits to control the flow and issue of program instructions from the I-cache to the E-boxes.

The purpose of providing a piplelined system is to avoid the latency delays associated with completely processing a single instruction before fetching the next instruction. Processing a single instruction may require many clock cycles. Rather than have one clock cycle only be useful for processing one instruction, pipelined systems allow the processing of instructions be broken down into smaller discrete operations thus allowing a portion of many instructions to be processed simultaneously. Generally, the discrete operations include reading instructions into the instruction cache, reading an instruction from the instruction cache and issuing the instruction to the execution box, and executing the instructions accordingly. This method of pipelining instructions results in a faster more efficient central processor.

Although the pipelined model has provided for faster computer systems, general purpose computers are still limited in that they can only execute one or in some advanced computer systems two instructions per clock cycle. It would be advantageous to be able to execute many instructions per clock cycle and thereby dramatically increase the speed at which a computer would perform its various functions.

A major obstacle in the way of parallel execution of many instructions is the organizational structure of conventional computer programs. As compiled, conventional computer programs present a linearly or sequentially ordered set of instructions which must be executed in the order presented to insure production of a correct or expected result. Although the computer hardware may be capable in some respect of executing more than one instruction at a time, taking a large group of sequentially dependent instructions and executing them in parallel often produces incorrect results since one instruction is often dependent on the completion of the instruction sequentially preceding it.

There have been various attempts at designing computer systems which overcome this problem of sequential dependence. However, these systems often require complex hardware designs which must be capable of on-the-fly reordering of instructions. Some designs simply do not guarantee a correct result for general purpose computer programs or, in order to guarantee a correct result allow for a very limited amount of rearrangement of the computer instructions resulting in a limited amount of parallel execution.

SUMMARY OF THE INVENTION

In accordance with the present invention a method of operating a computer system includes the steps of adding a first type of information to a set of linearly dependent computer instructions which are represented as a tree structure having segments where the branches include sets of instructions, and there are connected by nodes which are represented as decisional instructions. The added information are serial numbers corresponding to the order in which the computer instructions are arranged within each segment.

The method further includes the step of rearranging the set of linearly dependent computer instructions into a set of non-linearly dependent instructions which permits reconstruction of the linearly dependent set of instructions from the rearranged instructions. After the computer instructions are rearranged, additional information is added to the rearranged instructions. The additional information includes path codes which represent a path through the tree structure at which the instruction will commit.

After the additional information is added to the rearranged instructions, they are provided to a computer processor which executes several of the instructions simultaneously. With such an arrangement, general purpose computer programs can be executed by processors having parallel processing capabilities while achieving the same results or outputs as would be achieved by executing the general purpose program in a linear fashion, one instruction at a time. Additionally the speed at which the general purpose program is executed is substantially increased since the program can now be executed on a parallel processor which permits multiple issue and execution of computer instructions during a common processor cycle.

In accordance with a further aspect of the present invention, a computer system includes means for providing from a first set of computer instructions arranged in a linearly dependent order and represented as a tree structure, a second set of computer instructions. The second set of computer instructions is a non-linearly dependent rearrangement of the first set of computer instructions. Additionally, means are provided for executing several of the second set of computer instructions simultaneously.

Although rearranged and executed in groups, the computer system produces the same result as would be achieved had the first set of linearly dependent instructions been executed one instruction at a time and in a linear fashion. With such an arrangement, a computer system is provided which allows general purpose computer programs which previously required execution by a sequential processor can now be executed in a parallel fashion thereby drastically increasing the speed at which the program is run

BRIEF DESCRIPTION OF THE DRAWINGS

The above-mentioned and other features of the invention will now become more apparent by reference to the following description taken in connection with the accompanying drawings in which:

FIG. 5 is a diagram several registers included in the front end logic of the computer system in FIG. 1.

FIG. 6 is a diagram of additional registers included in the front end logic of the computer system of FIG. 1.

DETAILED DESCRIPTION OF THE PREFERRED EMBODIMENT

Building the Physical Program

Figure 1:
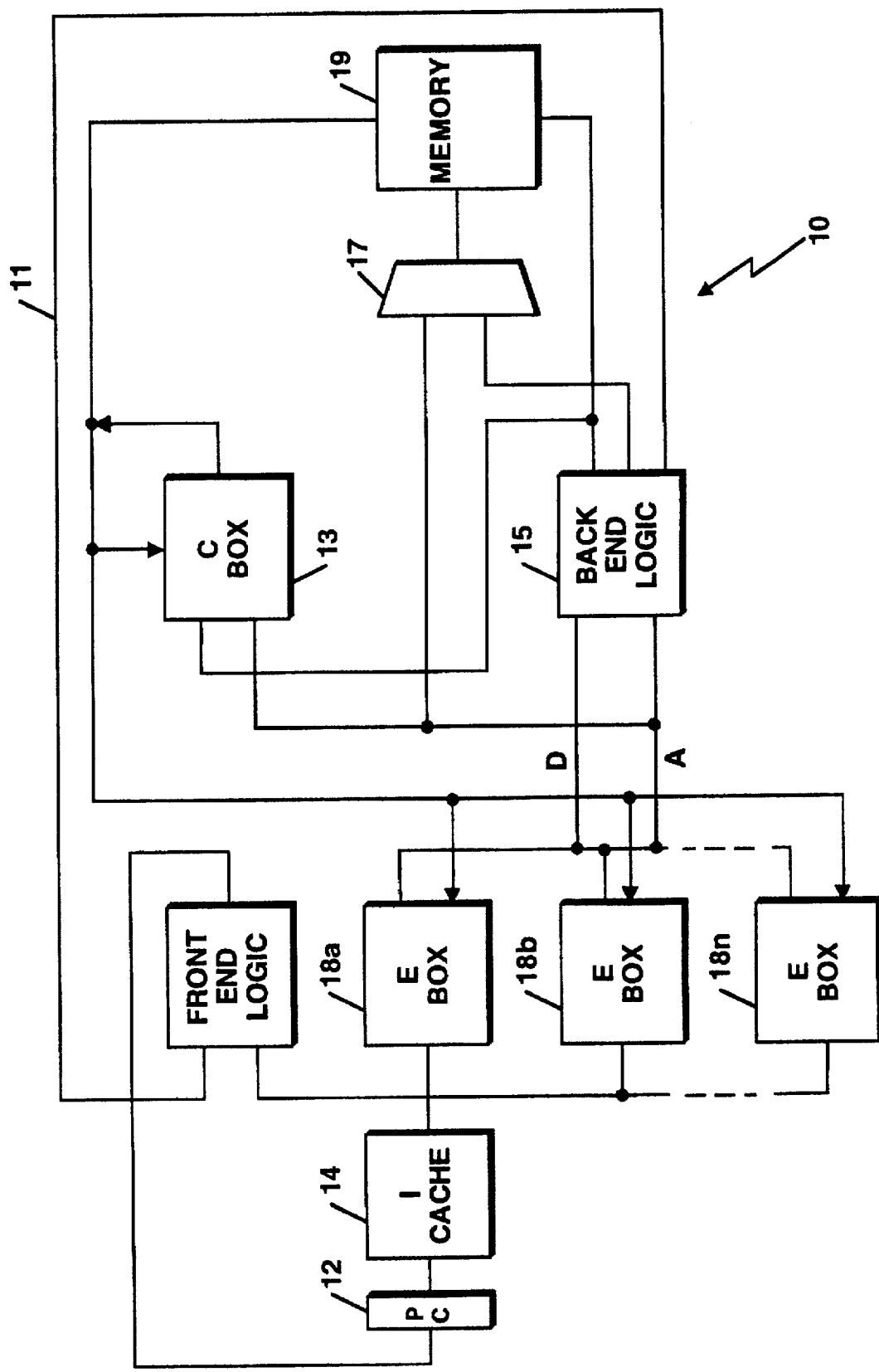
FIG 1 is a block diagram of a computer system capable of executing several instructions during each process cycle.

Referring first to FIG. 1, a computer system 10 is shown to include a program counter (PC) 12, an instruction cache (I-Cache) 14, a plurality of execution boxes (E-boxes) 18a–18n, a cache box (C-box) 13, memory ordering exception signal lines 11, back end logic 15, and a memory 19. During normal operation, multiple instructions are issued from the I-Cache to each of the E-boxes simultaneously and executed accordingly. The instructions to be executed in parallel are transferred to the E-boxes (i.e. placed on the bus) in the form of a single so called "very long instruction word" (VLIW). Executing many instructions simultaneously or in parallel allows a computer to accomplish its processing tasks much faster than conventional machines having a single E-box.

However, most general purpose computer programs (e.g. spread sheets etc.) are not able to take advantage of computer system 10's ability to process many instructions in parallel. The reason for this incompatibility is that general purpose computer programs are typically comprised of linearly order sets of instructions where a currently executing instruction depends on the completion of preceding instructions in order to produce a proper result. As such, executing several instructions in parallel that depend on each other will not produce the program's expected results or at least may require enough re-execution to defeat the advantage of executing several instructions in parallel.

Figure 2:
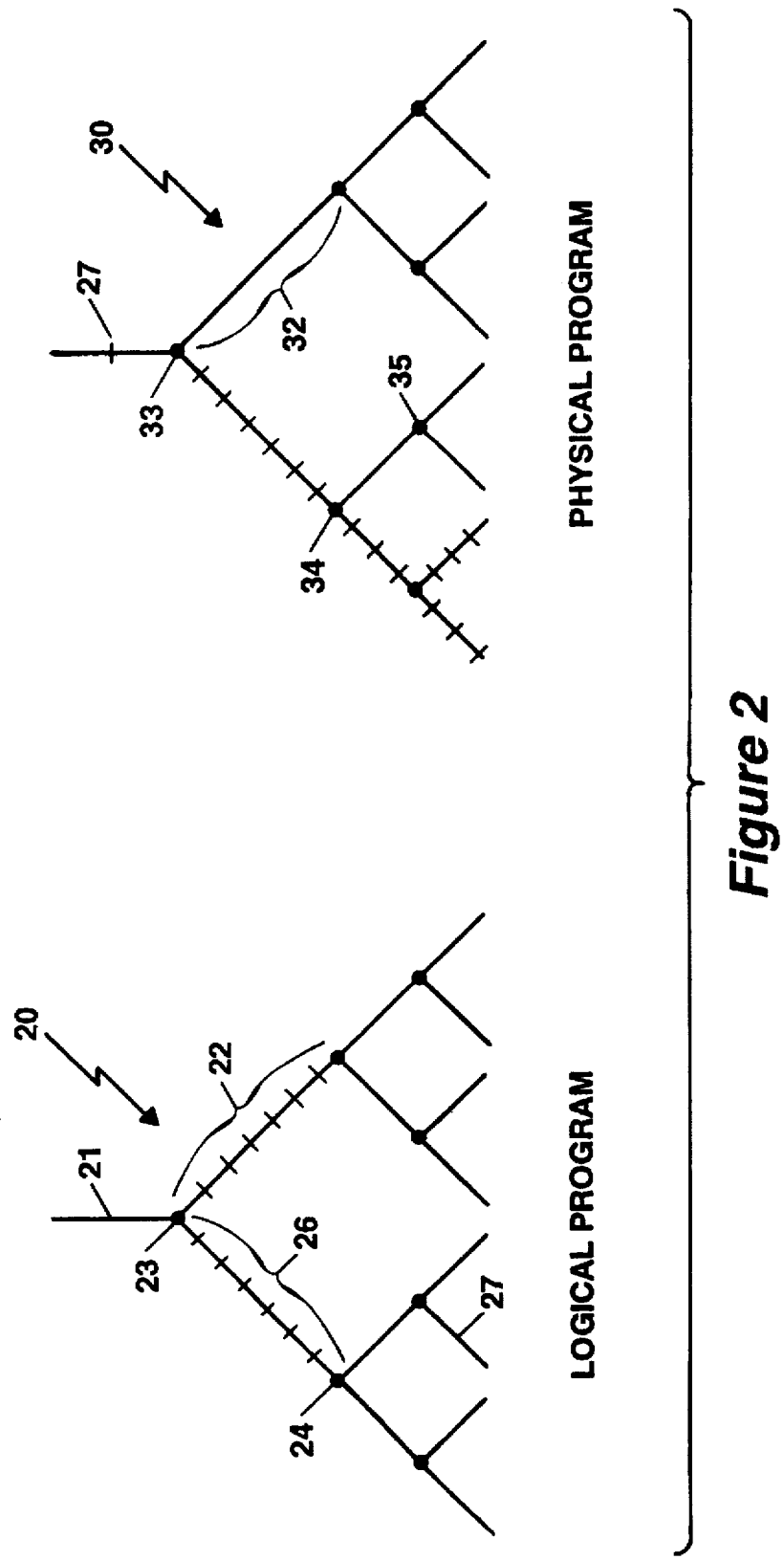
FIG. 2 is a diagram of the tree structures reprensenting a logical program and physical program executed by the computer system of FIG. 1.

In accordance with the present invention, general purpose computer programs are compiled is a manner which allows execution by parallel processing computers such as that shown in FIG. 1. Referring now to FIG. 2, a general purpose computer program may be represented by the tree structure 20. This tree structure is known as the so-called logical program. The tree structure 20 includes many segments which are connected at decisional points or nodes. Each segment includes a number of serially ordered dependent instructions that would be executed by a CPU. For example, tree structure 20 includes segments 22 and 26 which are connected by a node 23 to segment 21. During normal logical execution, instructions included in segment 21 would be executed by a CPU until node 23 was reached. Node 23 is actually a decisional point in the execution of the logical program. This node or decisional point may be thought of as a, a jump, or some other type of computer instruction which changes or redirects the flow of program execution.

At node or decisional point 23, program execution would continue either along segment 26 or along segment 22. If program execution were to proceed along segment 26, instructions would be executed until decisional point or node 24 was reached. Execution would continue in this fashion until the desired results or logical completion of the program was achieved.

Also shown in FIG. 2 is a so-called physical program 30. Physical program 30 includes a rearrangement of the instructions included in logical program 20. That is, all instructions in logical program 20 are rearranged following certain rules as will be described below and placed representatively on tree 30. There is a one to one correspondence between where an instruction is executed in logical program 20 and where that instruction would commit in the physical program 30 (i.e. in what segment the instruction would commit in the physical program).

For example, consider instruction 27 of logical program 20 which is shown positioned in one of the lowest segment of the program. During rearrangement of the instructions of logical program 20, instruction 27 may be placed in a different position along the tree of physical program 30. However, during execution of the physical program, instruction 27 will not commit, that is, will not have executed properly in logical terms, until the physical program has executed all logical instructions prior to and including instruction 27. Therefore, representatively, instruction 27 will not actually commit until the physical program reaches the same segment where instruction 27 was located in the logical program.

Figures 3, 7:
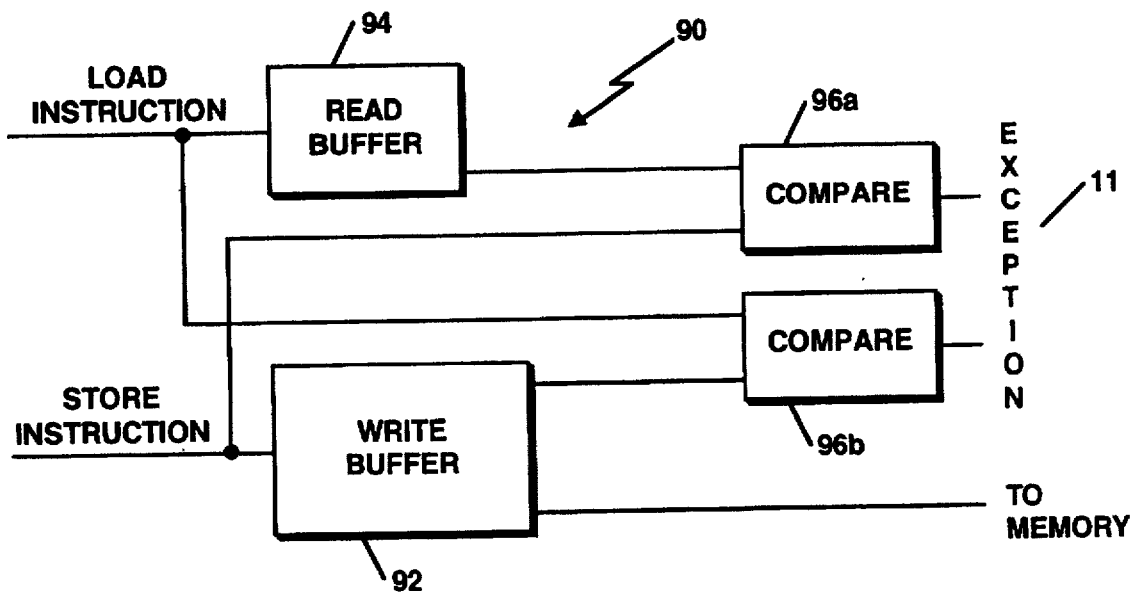
FIG. 3 is a portion of a logical program used to create a physical program.
FIG. 7 is a block diagram of the memory reference instruction controller of the computer system of FIG. 1.

As described in co-pending patent application Ser. No. 08/270,185 filed on Jul. 1, 1994, in order to be able to produce the correct or expected logical results while executing physical program 30, certain information must be added to each instruction of the logical program. The information added is that which would allow reconstruction of the logical program from the physical program. Referring now to FIG. 3, a representative logical program 40 is shown to include a number of individual instructions, each having an associated serial number. Logical program 40 is designed such that executing each instruction one after the other, will produce a correct or expected logical result.

Figure 4:
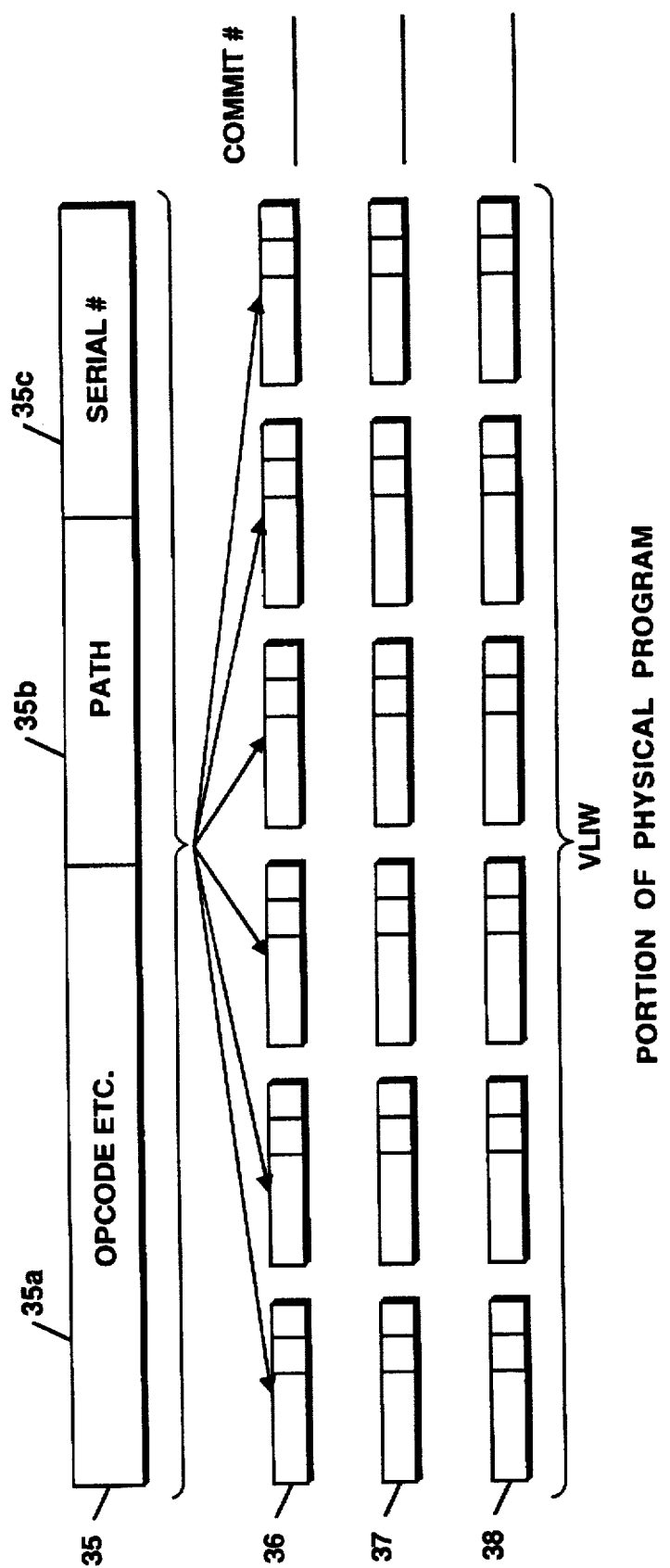
FIG. 4 is a diagrammatic representation of the contents physical program instructions.

Referring now to FIG. 4, an individual physical program instruction 35 is shown to include op-code information 35a, as well as path information 35b, and serial number information 35c. Also shown in FIG. 4 are three very long instruction word (VLIW) instructions which may be executed by CPU 10 (FIG. 1) during execution of the physical program. Each VLIW instruction 36, 37, and 38 actually includes several individual operating instructions as represented by logical program 40. However, as described above, information has been added to each of the logical program instructions in order to be able to recreate the logical program from the physical program.

Each operation in the physical program must identify which segment it belongs to (i.e., the segment where the instruction will commit), as well as carry a serial number corresponding to its placement within that segment. In the present embodiment, an operation in the physical program specifies the segment (in the logical program) that it belongs to by giving a path through segments, as they will be encountered physically, from where the operation appears physically to where it will physically be committed. To be precise, the path describes the segments that will be encountered (i.e. have all operations executed) before this operation commits, and the paths they take at decisional points.

The path concept can be understood from the following considerations. The point where an operation is committed in the physical program represents the logical segment that the operation belongs to. This follows since the commit point must be at a place that will be reached if and only if this operation is on the true path of execution. At this place in the physical program all segment branches logically preceding the operation have been taken and it is known that execution is on the path where this operation should be executed. This position in the physical program must correspond in a 1 to 1 fashion with the logical segment that this operation belongs to. As such, each operation in the physical program is effectively providing a so called self-relative pointer to the logical segment that it belongs in. This being the case, segments do not have to be given fixed names in a conventional sense.

As described above, each instruction in the physical program will have additional information added to it during compilation which allows the CPU to know at any given point during execution, how much of the logical program has actually been completed. In particular and still referring to FIG. 4, a first piece of information 35b is added to the instruction information 35a and is known as the path information. Path information is the self-relative pointer. As described above, the path information indicates to the physical program or the CPU operating the physical program, where the currently executing instruction is committed in terms of the logical program tree.

For example, referring back to FIG. 2, instruction 27 which is shown on the first segment of physical program 30, is executed well before the segment for which it occurred in the logical program 20. Therefore, in order to correctly determine where instruction 27 resides in the logical program, path information in the form of traversal through tree 30 will be appended to the instruction information in order to identify in the physical program where instruction 27 would commit in logical terms.

Traversal through the tree of physical program 30 is represented as the direction taken at any particular node, for example node 33, in order to reach the segment where an instruction commits. As an example, for instruction 27, traversal through the tree would require that the program go left at node 33, then go right at node 34, and left again at node 35, in order to roach the segment in which instruction 27 commits. Thus, the path for instruction 27 would be left, right, left, stop or LRLS. Stop indicates that traversal has reached the segment where the instruction will commit. The extent of a traversal or path through tree 30 of the physical program added to each program instruction is limited by the number of bits available to store information regarding that traversal through the tree. In this particular example, it may require as many as eight bits to store the traversal through a tree including four decisional points or four program segments.

Coding the path information may be accomplished using sets of two bits to determine which direction to go at any particular node. So for example, the first two bits of the path may have the value 01 to indicate a left turn, the next two bits may have a value of 10 to indicate a right turn, the next two bits again having the value 01 to indicate another left turn, and then the last two bits may be 00 to indicate stop or that the program segment for where the instruction commits has been reached.

In addition to the segment commit information or the path information, there is additional information which needs to be added to each instruction in order to be able to completely reconstruct a logical program from a physical program. That information includes a serial number of a particular instruction within a segment. For example, still referring back to FIG. 2, logical program 20, segment 22 may include 50 or more instructions with serial numbers 1–50 accordingly. This serial number information needs to be added to the instructions in the physical program in order to, when combined with the path information, allow reconstruction of the exact logical program from the physical program.

Finally, each VLIW instruction of the physical program should include a commit number which indicates how far execution through the logical program has completed following the execution of the particular physical program instruction. A commit number is defined as the serial number of the associated logical program instruction which indicates that every logical program instruction previous to this serial number has been executed. Of course, other instructions, including instructions having serial numbers greater than the commit number and/or instructions committing in future segment may have been executed (speculatively) as well.

Rearrangement of the logical program into the physical program is accomplished following the rules set forth in previously filed patent application Ser. No. 08/270,185 filed on Jul. 1, 1994, and incorporated herein by reference. In that application, instructions were allowed to be rearranged quite freely but only along a trace or linear path through the program. In contrast, the present invention goes beyond this limitation and does not restrict the set of instructions that may be rearranged to be on a linear path. Generally, instructions in a tree similar to that as shown in FIG. 2 my be freely reordered. In fact, execution of the program can be thought of as a moving tree with some maximum height or levels. In the preferred embodiment, a maximum level of 4 is used. The use of four levels is not a limitation of the present invention but, as described above, a limitation imposed on the preferred embodiment due the number of bits available to describe traversal through the tree.

Specifically, by and large, any instruction may be moved (reordered) up the tree from where it originally exists in the logical program to a segment which is, here illustratively, a maximum of 4 levels from the original position. Remember that each segment contains many instructions and as such, the moved instruction may be placed anywhere along the new segment.

According to the present invention, the processor described below is capable of executing the physical program (rearranged instructions) and produce the same results as if the original logical program had been executed on a conventional processor. Also according to the present invention, the compiler which produces the physical program will use the ability to reorder the logical program such that the processor may execute many instructions in parallel. In addition to the rules of rearrangement set forth in the above mentioned application, the tree model of a logical program requires additional rules be adhered to during rearrangement of instructions.

In particular, during compilation, a so called "join" operation may not be coded (appear) between a segment branch jump instruction and its commit point (i.e. the actual instruction which causes the segment to commit). Additionally, a so called "segment declaration" may not occur between a segment branch jump and its commit point. Joins and segment declarations will be described in detail below. There is normally little disadvantage in compiling with these requirements. They are normally complied by placing the segment branch jumps in the physical program very close to the segment commit point. This placement does not have any disadvantage.

Hardware

Referring now to FIG. 5, front end logic 16 of computer system 10 is shown to include a so called "logical level" register 62. In the preferred embodiment, the logical level register is a 4 bit register used by the CPU to maintain a "current logical level" number. Each time a logical program segment commits, the level number is incremented. As will be described in more detail below, program segments commits when a cycle of instructions (as shown in FIG. 4) executes and the commit number associated with that cycle has the value 255. In accordance with the invention, the compiler will arrange the instructions so that this happens when each instruction which should have been encountered in that segment and all logically preceding instructions have executed. The logical level number is circular and modularly ordered.

Front end logic 16 also includes a so called "preamble register" 64. The preamble register is a single entry register. In accordance with the preferred embodiment of the present invention, preamble register includes twenty bits of storage for identification of a particular instructions position in the physical program. Of the twenty bits, eight bits are used to store an instruction's associated serial number, eight bits are used to store a path associated with the instruction, three bits are used to store the path length of the path, and one bit is used as a valid bit. The preamble register 64 is loaded, by the CPU, with the path of a target instruction, when a segment jump or jump out instruction is committed. The preamble register is also loaded with the path of a target instruction when a return from interrupt or exception is committed. This follows since interrupts and exceptions are both similar to a jump out instruction. In actual fact, when a segment jump or jump out is executed, its target path is saved. When it commits then the path information is copied to the preamble register.

The contents of the preamble register 66 are changed when a segment earlier than the target segment commits. Furthermore it is by virtue of the preamble register not being empty (i.e. valid bit set) that it is known that the commit is for an earlier segment. When execution of instructions has reached the commit point of the target segment, the preamble register will be emptied (valid bit reset). The preamble register will remain empty and not be a factor again until another jump instruction causes it to be reloaded.

Referring now to FIG. 6, the front end logic further includes a History register 76. This register contains the last four segment branch directions (i.e., "right" or "left") that have committed. As each new segment commits, the History register is shifted and the branch direction of the newly committed segment is shifted in.

It may be necessary to use information about instructions for some time after they have been executed. The information is of primary importance to the back end logic (FIG. 1) and associated transactions associated therewith (i.e. reading and writing data). The history register is used to determine if instructions that executed some time ago were on the true path of (logical) execution.

During operation, certain information pertaining to segments is stored in a register file. Still referring to FIG. 6, Front End Logic 16 is further shown to include Tree register file 70. Tree register file 70 includes two sections, 72 and 74. The first section 72 is a 31×7 register (31 entries of 7 bits each) and the second part is a 32×1 register. The tree register file is used by the CPU to store information regarding declared segments. The first part 72 includes storage for a pointer to a location in the Pool register (described below) as well as a bit to indicate whether a segment has been declared and a death bit. The pointer in the tree corresponding to the Pool register is known as the Slot entry. The second part 74 includes storage for a single bit for each future segment and is referred to as a so-called death bit. If the death bit is 0, the segment is known to not be on path. If it is 1, the segment might be on path of logical execution. All 63 death bits together from both the first and second parts are known as the "death mask".

Front End Logic 16 further includes Pool Register file 80 which is shown to be a 32×73 register. The Pool Register is filled in during the declaration of segments. For convenience, the declaration of segments operation will be described later. Each entry in the Pool Register file 80 includes 48 bits of address information indicating the address at which the segment was declared. This address information is also known as the segment origin. In addition to the segment origin, 8 bits are provided to store the segment name at the segment origin. The segment name is the bit code indicating traversal through tree 30 (FIG. 2) to where the segment commits. In addition to the segment name, other information is stored in the Pool Register file, in particular: the direction of the segment (i.e. left, right, or unknown), if there has been an exception request in the segment (the V bit), and if so, what type of exception it is and the serial number of the instruction causing the exception. These three fields, V, Exception type, and serial number are sometimes referred to as the "Segment Transfer Image" and are stored in the Pool Register file for each segment.

Conceptually all of this information stored in the Pool Register file can be thought of as a table organized as a tree. The root of the tree is the currently oldest "on path" uncommitted segment. All other locations are for segments that are descendants. The data in the Pool Register file 80 is accessed by addressing it using the value of a path relative to the currently oldest uncommitted segment. There is actually quite a bit of information stored for each segment. Conceptually it would be convenient to have all of the information in a tree structure fiat shifts. However current hardware makes it inconvenient (i.e., there are too many bits to shift) or impractical. As a result, the information is stored in two parts. The tree is the first part and it does really shift.

The tree is basically a collection of pointers into the Pool Register file 80 and a minimum of other information such as the death bits. The tree is small so it is feasible to make it shift. Most of the useful information is stored in the Pool Register file which is large and not required to shift. The Pool Register file is accessed using pointers from the tree. Therefore, if the tree shifts, it is logically equivalent to shifting the Pool Register file. That is, the desired shifting of a large structure like the Pool Register file 80 is accomplished by shifting the tree of pointers to the Pool Register file structure which is much more practical to implement.

The path of an operation may be used to access information about its segment stored in the Pool Register file but only after it has been brought up to date. To update the operation's path, the current logical level stored in the Logical Level Register 62 (FIG. 5) is subtracted from the logical level of the operation under consideration. If the result of the subtraction is the same as the length of the path the operation specifies, then the path is up to date and can be used to access the table. However, the path length for an operation might be more than the logical level of the operation minus the current logical level. If that is the case there are two steps which may be followed: 1) determine if this segment is not in the tree (i.e. it is definitely off the true path of execution) and, 2) find the up to date path. Steps one and two are accomplished via the following determinations:

A. If the logical level of the operation minus the current logical level is negative then the segment is either already committed or off path. This indicates that the commit point for this operation has been passed.

B. Front End Logic 16 also includes a History Register 76 as shown in FIG. 6 which holds the record of past committed segments. Form the number, length of the operation path minus the operation logical level plus the current logical level, and call it "H". Compare the first H symbols in the operation path with the last H symbols in the History Register. If they do not match then this operation is off the tree and off the true path of execution.

C. The updated path is obtained from the operation path by removing the first H symbols from it, i.e. those symbols that matched the history register, and keeping the rest as the updated path. The updated path is shorter by H than the operation path. Notice that the operation logical level minus the current logical level equals the length of the updated path.

The current operation can be directly matched with the death mask at this time to see if it is off path. It can be seen that the operation can also be matched with the death mask anytime in the future by virtue of comparing only the last N entries in its path with the death mask, where N is the difference between the logical level of the operation and the current logical level. In addition, the leading entries that are truncated off may be compared to the history to see if it is completely off the tree.

A pool location may be taken from a free list when a segment is declared. Data for this segment is kept in the location addressed by the value taken from the free list. When the segment falls off the tree or is committed, then the location address is returned to the free list.

Referring now to FIG. 7, memory reference instruction controller 90 is shown to include write buffer 92, read buffer 94, compare units 96a and 96b and exception signal generator 98 coupled to compare units 96a and 96b via signal lines 91 and 93 respectively. Since, as described above, many instructions may be executing in parallel and further, may be executing out of order, it is necessary to be able to resolve memory references which occur out of order. That is, if a load instruction is done prior to a store instruction which intended to provide the information for the load instruction, it is imperative to sort out and make sure that the load instruction does actually obtain the correct data from memory. This function is provided by the memory reference instruction controller 90.

The memory reference instruction controller 90 does not interfere with reads from the cache. The address that is to be read, as soon as it's generated, goes to the cache which is followed by a data lookup and a data return to the E-box (FIG. 1). Although the logic 90 does not interfere with these operations, it does monitor all that is going on, and receives a copy of the address supplied to the cache. Even in the event of a cache miss, reads from memory can be performed with the back-end logic monitoring the reads and not interfering therewith.

The memory reference instruction controller 90 is however on the path of, and is active in, any writes to memory or cache. The two primary pieces of logic included in the back-end logic are the read buffer 94 and the write buffer 92. The read buffer 94 monitors all loads (i.e. reads from cache or memory) that are executed by the processor. The read buffer is a memory with records allocated for the storage of information concerning load instructions. In general, the read buffer 94 receives information that there was a load instruction in the form of the load instruction's path, serial number, logical level, and the address to be accessed by the load instruction. This information is stored in a record within the read buffer 94.

Since the read buffer is of a limited size, it is necessary to be able to flush or empty the buffer on occasion to avoid overflowing the read buffer's memory. Flushing the read buffer can occur in either one of two ways. The first method of flushing the read buffer is accomplished using the commit numbers associated with instructions. Whenever an instruction is committed, there is no longer any need to have it stored in the read buffer. As commit numbers come in with groups of instructions going into the E-boxes, they are communicated to the read buffer which compares the commit number and current logical level with its records. All entries that have logical levels equal to the current logical level and serial numbers preceding or equal to the commit number are deleted. The space for those deleted entries is then available for use to store new entries.

The second method of flushing the read buffer is related to control flow changes. When a control flow change is actually committed. As described below, control flow changes correspond to jump, branch, or exception type instructions. The read buffer must be notified when there was a control flow change. The reason is that when there is control flow change, the read buffer should be emptied since once a control flow change has committed, none of the information in the read buffer is needed. The reason for this is, at that point, the only thing that is in the read buffer is the uncommitted instructions. Since execution has "jumped" to a new location, those instructions in the read buffer are instructions that never should have been executed in the first place so they can be discarded without consequence.

Write buffer 92 actually has a similar function to read buffer 94. All store instructions (i.e., writes to cache or memory) actually go to the back-end logic, they do not go directly to the cache or to the memory. During each store instruction, the operation path, serial number, logical level, and the address of the memory location along with the data to be written is supplied to the write buffer. So, the write buffer has all of the information needed to later place the information in memory.

The write buffer records this information in a way which is very similar to manner in which the read buffer records its information. That is, the write buffer is a memory with a limited amount of storage for recording information about store instructions. Every store that is executed, is recorded in an entry in the write buffer. Like the read buffer, the write buffer has limited storage and must be flushed periodically. Also like the read buffer, the write buffer is flushed when store instructions are committed but, here, the instructions are not simply discarded. With the write buffer when the instruction is committed, the data from the store instruction is actually placed in the memory or in the cache. When a particular store instruction has committed, it is known that the write to memory should really take place and that is when it is written into memory or cache, and not before. Basically, any stores to memory are held in the write buffer until it is known that the operation should actually be performed. When a group of instructions is placed in respective E-boxes, the commit number associated with them gets transmitted to the write buffer and compared with the serial numbers of all the records stored in the write buffer. Every buffered write instruction that has a logical level equal to the current logical level and a serial number equal to, or preceding, the commit number transmitted from the E-boxes, will be removed from the store buffer. For each such instruction, the path is compared to the History Register. Those instructions that match are on the true path of execution and are thus transmitted to their memory destinations. Those that do not match are not on the true path of execution and are thus discarded.

At this point, in order to mimic the way in which a conventional computer would operate, the buffered writes which were found to match the History Register are released to memory in accordance with serial numbers, by serial number. Since the writes are released to memory in logical order, different writes to the same address that were logically supposed to be in a certain order, but were physically executed in the reverse order are sorted out. That is, the instructions went into the write buffer in backwards order, but in fact, they were sorted into the correct order when they finally went into memory.

The other way in which the write buffer is flushed is when there is a control flow change. First of all, when there is a control flow change that is actually executed (as described above) that fact is reported to the write buffer. Assuming now, that all instructions that are committed were released to memory and then there is a control flow change that is committed, everything else in the write buffer is just discarded. So, as a result of a control flow change that actually happens, the read buffer is empty and the write buffer is empty essentially providing a clean slate.

There are two other considerations with each load and store instruction. A compare operation is performed for every load instruction and for every store instruction. For every load operation a compare is performed by compare logic 96b between the current load instruction and everything that is stored in the write buffer. The compare is performed to find cases when the address for the load instruction matches an address that is stored in the write buffer. A match implies a store to this address was performed recently and the processor is trying to do a load from the same address. Once an address match is found, the logical levels and serial numbers of the matching instructions are examined to see if the store in the write buffer is logically earlier than the load that is currently being executed. Then the paths of each are checked to see if the store is on the path to the load and to see if either instruction is dead. The instructions are of interest if the store is on the path to the load and they are both "non-dead" (live) instructions. If the store in the write buffer is logically earlier, the new load instruction that is being processed and being stored in the read buffer should be returning the data that was stored via the store instruction with the earlier logical level and serial number.

At this point it is known that the processor did not get the correct data since it is recorded in the write buffer, which means it has not yet gone to either the cache or memory. That is, when the processor, looked up this particular address in the cache, it found what was in the cache at that time but the data was not that which the processor should have received. To correct this problem, a so called "memory ordering exception" is declared. A memory ordering exception is a special type of exception that is declared by asserting a signal on dedicated signal line 11 (FIG. 1) and is used to indicate that memory ordering exception has occurred. Signal line 11 is actually a plurality of signal lines which carry the path, serial number, and logical level of the instruction which caused the exception, back to the instruction monitor and control unit 16 (FIG. 1). When a memory reference causes an exception, the serial number of the instruction causing the exception is transmitted from compare units 96a or 96b via signal lines 91 or signal lines 93 respectively (depending on whether a load or store instruction caused the exception) to exception signal generator 98. Exception signal generator in turn passes the path, serial number, and logical level of the exception causing instruction, along with signals indicating that an exception has occurred, back to instruction monitor and control unit 16 (FIG. 1).

In this case, the load instruction is the causing instruction. Declaring this exception puts it in competition with all the other control flow changes that may have been declared. As far as the processor is concerned, there is nothing special about this exception so it is arbitrated in the instruction monitor and control unit as will be described in detail below with other control flow changes.

If and when the exception control flow change gets committed the usual sequence is followed to take the exception. The memory ordering exception handler does nothing but return from the exception. Upon return, execution resumes at a suitable address defined by the values reported to the operating system when the exception was taken. The faulty load instruction is identified by its path and serial number. The processor then executes the load instruction again and also executes every instruction which logically follows it. As before, operations logically preceding the load are filtered out.

In order for the exception to be committed, the causing instruction (i.e. the load in this case) must have committed. That is, when load instruction commits, the store instruction having the data which is the object of the load instruction is logically earlier so it must have committed previously.

Therefore, the data has gone to memory and the cache. Now, when the load is executed over again, it will retrieve the correct data. By taking the exception on the load, memory and the cache are forced to be brought up to date enough such that the load can retrieve the correct data.

As described above, each store instruction that is issued, is recorded in the write buffer. Additionally, every store instruction must be compared to everything that is stored the read buffer. The compare is done in order to determine if there are load instructions in the read buffer that represent loads that are logically later than the store instruction presently executing. Like load instructions, a compare is done to determine if there is an address match between the currently executing store instruction and any load instruction in the read buffer. If there is a match, the logical level and serial number of the store instruction is compared to the logical level and serial number of the matching load instruction. If the logical level and serial number of the load instruction is logically later than the logical level and serial number of the store instruction, the load instruction could not possibly have returned the correct data since the store instruction which was to have placed the data in memory for the load instruction is just now executing. At this point the paths of the store and load are examined to determine if the store is on the path to the load and to determine if either instruction is dead. The instructions are of interest when the store is on the path to the load and both instructions are live.

To alleviate this problem, a memory ordering exception is declared as described above for load instructions. Unlike the case for load instructions, a complication here is that there actually could have been a series of load instructions that were all referencing the same address and as such all have this problem. It would be possible to declare a series of exceptions but it is only necessary to declare an exception on the logically earliest load that has the problem.

In order to declare an exception on this load instruction it must not have committed yet. In this case, since the load instruction is in the read buffer, it is known implicitly that the instruction has not been committed. That is, since the store instruction itself has not committed yet or may be just getting committed, it is known that all loads that follow this store could not have committed yet. This ensures that all of the loads that reference the address of the logically earlier store instruction will in fact be in the read buffer. Since these instructions have yet to commit, exceptions can be declared for each one. It is however only necessary to declare an exception on the logically earliest one. The exception is performed as described above in connection with the load instructions. Once the exception itself has committed, which is effectively the time when the load tries to get committed, then the exception process is actually performed.

Notice that at this point, when the exception is committed, the load is committed as well. Therefore the store that caused the problem, which is logically earlier, is also committed thereby placing the data in memory and the cache. By taking this exception, the memory and cache are brought up to date as of that load instruction. That is, logically, memory and cache are brought up to the correct state such that, when the load is re-executed, it will retrieve the correct data. It can be seen then that it is possible to arbitrarily order any loads and stores and still produce the correct result.

Processing the Physical Program

Although segment declarations are not explicitly coded, there are certain operations which may be performed by the hardware when a new segment is introduced. This operation is a so called "segment declaration". Each segment should be declared physically by the time any operations in that segment are encountered by the CPU. The purpose of the declaration is to establish the so called "trace origin", that is, the program counter (PC) value to return to after an exception or interrupt. For this reason the point of declaration should precede all operations for the segment. When returning to the point of declaration, all operations for this segment as well as all logically following segments should be encountered (i.e. executed). As such, segments should be declared in correct logical order. That is, a descendent segment should not be declared before all its ancestor segments have been declared. Segments that do not have a descendent relationship, may be declared in any order.

Target segments of all branches, jumps, etc. are implicitly declared by the hardware if they have not already been declared. The hardware implicitly declares a segment when any operation from that segment is encountered. The hardware should observe the above rule about descendants and ancestors. Hence whenever the hardware declares a segment, it automatically declares all ancestors of that segment that have not been declared.

When the hardware declares a segment, it captures the physical address at which the segment is declared, and the name of the segment, as a self-relative pointer, at the captured physical address.

Process a declaration

A stated above, a declaration is never explicitly coded. The declaration process is triggered by some other processing as will be described. There are three arguments to declare a segment:

1. The tree location being declared
2. The Segment Origin physical address
3. The Segment Name at the Segment Origin To begin, a pointer to an entry in the Pool Register is obtained from the free list. This pointer is written into the Slot of the Tree Register and the segment represented in the Tree Register is set to declared. In addition, the storage area in the Pool Register is initialized. That is, the direction is set to unknown. Further, the Segment Origin physical address is written into the Segment Origin for this segment, and the type is set to "no exception requests". The Segment Name at the Segment Origin is also entered into the Pool Register.

Once the appropriate registers are loaded, all ancestors of this tree location are checked to see if they have been declared. If any ancestor is not declared then it is declared at this point. As above, a pointer to an entry in the Pool is obtained from the Free list and placed in the Tree. The entry is also initialized as described above. The Segment Origin physical address will be the same one used for the target tree location. The Segment Name at the Segment Origin is not the same as used above but is derived from it. It comes from truncating the appropriate number of levels off the end of the Segment name used above.

Shift the Tree

Figure 9A:
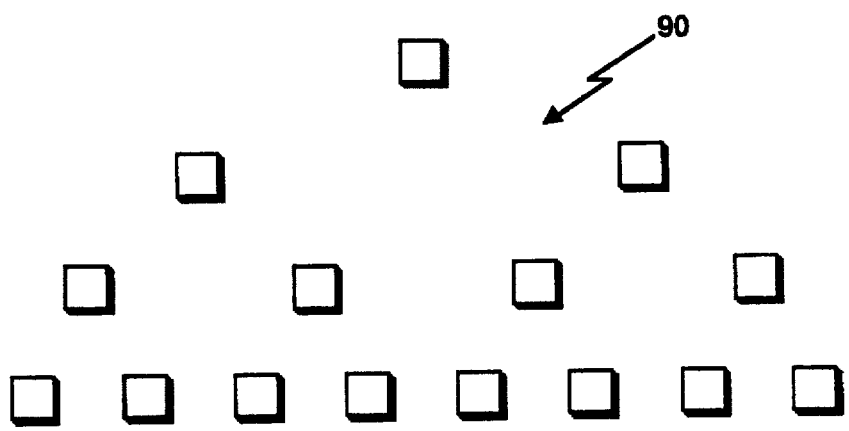
FIG. 9a is a diagram of an example embodiment of the tree structure.
Figure 9B:
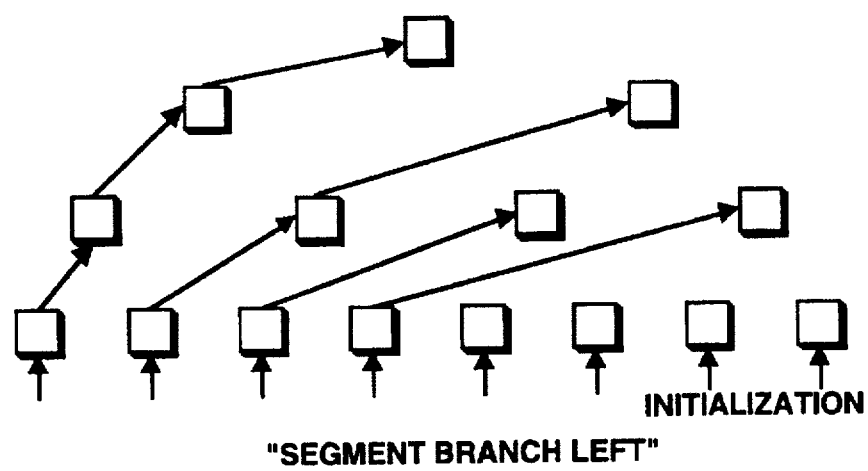
FIG. 9b is a diagram of an example embodiment of the tree structure of FIG. 9a showing loaded state information of storage devices for a left segment branch.

Referring to FIG. 9a, the tree structure 90 of the present invention is shown to include a number of storage devices that may either retain their present state or else be loaded with a new state. In the preferred embodiment, a new state is present to each storage device via 2 input MUX (not shown). The select inputs of all of the 2 input MUXes are tied together. The entire structure then can perform one of three possible functions during each operation cycle: 1) retain its existing state, 2) shift for a left going segment branch, and 3) shift for a right going segment branch. FIG. 9b shows how the state of each storage device is loaded for a left going segment branch while FIG. 9c shows how the state of each storage device is loaded for a right going segment branch.

Each storage element of the tree structure includes three fields, a declared bit, a pointer, and a death bit. For ease of understanding, it may be helpful to consider the Tree as separated into two similar structures, one structure containing the declared bit and pointer, and one structure containing only the death bits. This separation is presented for ease of explanation only and should not be seen as a limitation of the present invention.

Figure 9C:
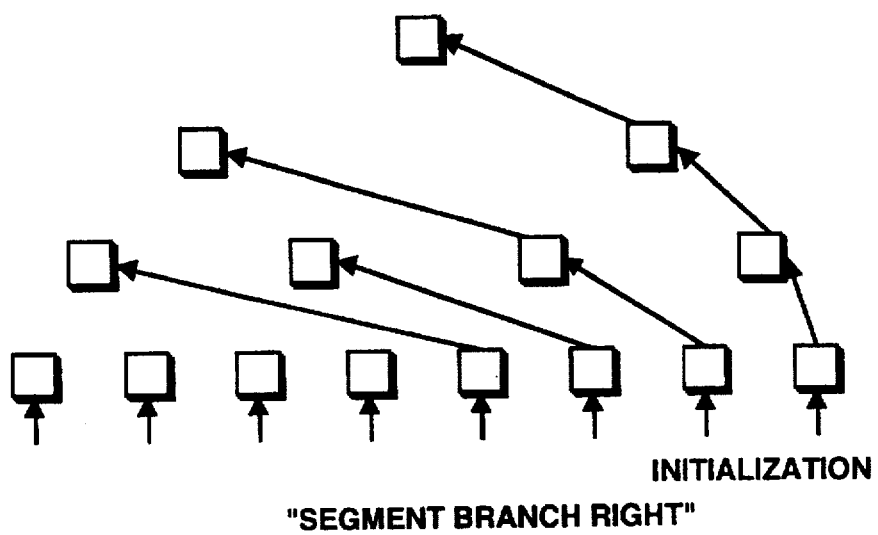
FIG. 9c is a diagram of an example embodiment of the tree structure of FIG. 9a showing loaded state information of storage devices for a right segment branch.

The tree containing the declared bits and pointers is four levels deep as shown in FIGS. 9a–9c and has 15 discreet storage elements or locations. When the Tree shifts in either direction, the bottom level of eight storage elements are initialized to "undeclared".

The tree containing the death bits is actually five levels deep, one more level than shown in FIGS. 9a–9c, but structured analogously. It therefore includes a total of 31 locations of one bit each. When the death bit tree shifts in either direction, the bottom row of 16 locations initialize to the same state that its "parent" becomes due to the shift. For example, location 120 would take the value of its parent 110 which is becoming the value from location 130. When the shift is completed, the fifth level child of a dead fourth level parent is dead and the fifth level child of a live fourth level parent is live.

Kill Operation

The kill operation has one argument, the tree address. The addressed tree node and all of its descendants are set to dead.

Process an instruction

During operation, the execution box processes operations issued from the I-box. In parallel, the front end logic (FIG. 1) performs certain functions and determines if the results should actually be stored in the register file. The first step for the front end logic is to determine if the instruction is in the preamble or not. The Preamble Register defines what instructions are in the preamble. A branch or jump instruction goes to an exact logical target. In order for this to be accomplished, the address from which instructions are fetched as a result of the jump or branch must be early enough such that the instruction which is the logical target and all instructions that logically follow it are encountered. Remember that the physical program is a rearrangement of the logical program which means that instructions which are logically subsequent to the target address may actually precede the instruction in the physical program. In general fetching of instructions will begin at an address which ensures the execution of all necessary logical instructions associated with the target address. However, instructions which logically precede the target should not be executed. As a result a mechanism to filter out these preceding instructions is needed. According to the preferred embodiment, the Preamble Register is used to perform this function.

On every control flow change (e.g., branch or jump) the Preamble Register is loaded with a description of the exact logical target. As such, it then identifies those instructions that should not be executed as a result of the control flow change. This set of instructions which is filtered from being executed is here known as the "preamble". If the operation is in the preamble it is effectively ignored. This means that the result will not be stored in the register file, a store to memory will not be done, etc. The hardware determines whether an operation is in the preamble as follows:

If the Preamble Register is empty the operation is not in the preamble. The operation is in the preamble if the path length of the operation is less than the path length of the Preamble Register. Assume that the path length of the operation equals the path length of Preamble Register. If the two paths do not match, the operation is in the preamble. If the paths match but the serial number of the operation in question is less than the serial number in the Preamble Register, the operation is in the preamble. Otherwise it is not. Assume then that the path length of the operation is greater than the path length of the Preamble Register, N. Match the first N entries in the path of the operation with the Preamble Register; if it matches it is not in the preamble. If it does not match, the operation is in the preamble. A match is determined when N=0.

The second step in processing an operation is to determine the logical level of the operation. The logical level of the operation is a number calculated as the Current Logical Level+Path length of operation−N, where N is the path length of the Preamble Register. N is 0 if the preamble register is empty. The operation is tagged with its logical level which then travels with the operation. Additionally, the corrected path of the operation is determined in order to facilitate looking up the instruction in the tree. As an example of how the corrected path is determined, consider the case where execution is proceeding along with no branch or jumps or any other control flow changes. The instructions are being executed in the current segment and as such their path identification is "S" (or stop). Looking these instructions up in the tree shows that they are at the top of the tree. Now, if a segment branch is encountered (and assume it goes right) the instructions branched to have path identifications (before the actual branch takes place) of "RS" (or right, stop). When the branch actually occurs, the tree is shifted (as described above) and the instructions branched to will now be in the current segment and will be at the top of the tree and correspondingly having path identifications of "S". However, if execution causes a jump to another segment (up to four levels away, e.g. the segment having a path "LRRL") the Preamble Register will contain the path to the target segment, here "LRRL". To properly look this segment up in the tree, all Preamble Register contents (LRRL) should be removed from the path carried by the instruction (again, LRRL). Once done the corrected path will be simply "S" as expected.

In short, the corrected path is the result of deleting the first N entries off of the path of the operation. If the Preamble Register is empty, it is exactly the path of the operation, otherwise, the part that matches the Preamble Register is removed and the remainder is saved.

At this point the operation to be executed can be looked up in the tree (i.e. Tree Register 70). First, from the Tree Register 70, it is determined if the segment containing this operation is already dead or not (i.e. has its associated death bit set). If it is dead, the operation is ignored (i.e. not processed further). Otherwise, if the operation is not dead a determination is made to see if the segment has been declared. If it is not already declared then it is declared (see process a declaration above). The parameters for this declaration are: the Tree Location which has a value equal to the corrected path of the operation, the Segment Origin which has a value equal to the physical address of the operation, and the Segment Name at the Segment Origin which is the Segment Name (uncorrected) as it appears in the operation.

The next step is to obtain the pointer to the Pool Register for this segment. This pointer remains with (i.e. is carried with) the operation from this point as part of the instruction. This pointer is useful when the instruction reaches the back end logic of the computer system.

All operations undergo the basic processing described above. The following discussion describes various kinds of operations and the things that might occur during execution (e.g. an exception request).

Process a segment test

Branches are coded in two parts, the segment test (e.g. branch if not equal to 0; BNEQ) and the destination part which indicates the direction of processing (referred to as the "segment jump"). When a segment test is executed, the direction for its segment is set, in the Pool Register, to the result of the segment test. A kill operation (see Kill operation described above) is also performed on the so called "losing child" (i.e. the path not taken) in the tree.

Process a segment jump

There are two cases for segment jumps which may be considered. The segment jump may be part of the preamble (i.e. should not be executed) or the segment jump may not be in the preamble.

A. The Segment Jump is in the Preamble

Suppose the path of the segment jump is P elements long. A comparison is performed between the path of the current segment jump instruction and the first P elements of the Preamble Register. If the path of the segment jump does not match the first P elements of the Preamble Register, then the segment jump is ignored. If the first P elements do match, execution proceeds as follows.

Figure 8:
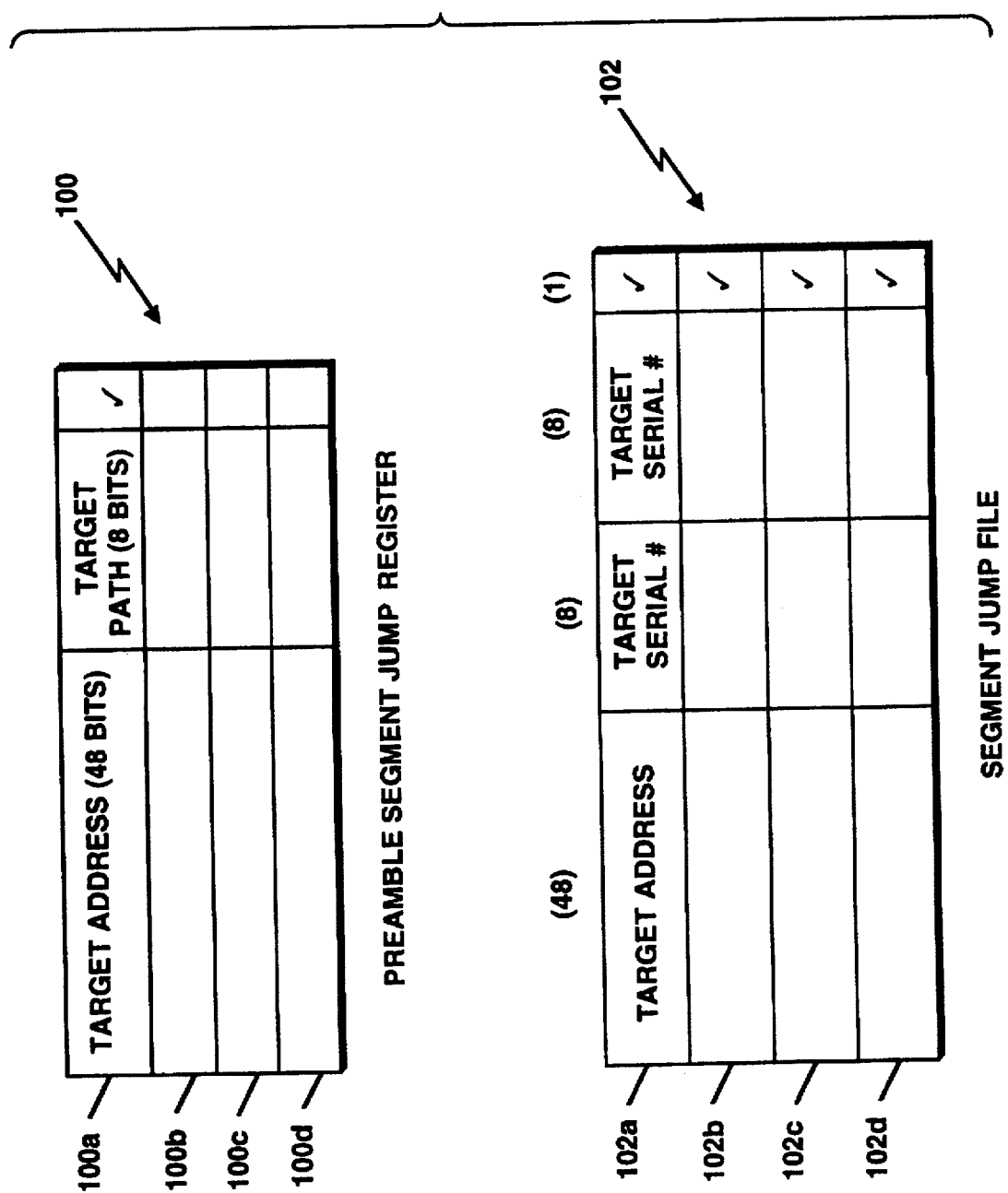
FIG. 8 is a diagram of the Preamble Segment Jump Register and the Segment Jump File of the included in the front end logic of the computer system of FIG. 1.

Referring now to FIG. 8, a four entry Preamble Segment Jump Register is shown and is included in front end logic 16 (FIG. 1). Each entry 100a–100d of the Preamble Segment Jump Register includes 48 bits of storage for address information associated with the destination of a jump instruction as well as a target path and a valid bit.

A number is calculated as the Preamble Register length minus the Segment Jump Path length (N-P). Possible values of this number are 1,2,3, or 4. This number is used to select one of the four Preamble Segment Jump Registers 90a–90d. The Pth element of the Preamble Register determines if this segment jump is taken (actually executed) or not. The "segment branch" can actually have up to 3 parts: test, left jump, right jump. The test must be present. The jumps are optional. All three parts are assigned the same serial number, e.g. 255.

The test indicates the execution will proceed either left or right. This information is stored in the Pool Register for this particular segment. The behavior of the (possibly two) jumps depends on this stored information. If execution will branch left and there is a "left jump" stored, the left jump will be taken whereas a right jump will not be taken. Conversely, if execution will branch right and there is a "right jump" stored, the right jump will be taken whereas a left jump would be ignored. At the end of the segment there can either be a fall through of execution for one way and a jump for the other, or there can be a jump to either of two locations. However, in the preamble the test is ignored. The Preamble Register only indicates "left" or "right". If it is taken, then the selected Preamble Segment Jump Register is loaded with the target address of this segment jump and the target path. The entry is then set to valid.

B. The Segment Jump is not in the Preamble

Still referring to FIG. 8, front end logic also includes four Segment Jump File Registers 102a–102d. Each of the Segment Jump File Registers includes storage for 48 bits of address data, 8 bits for segment name information, 8 bits for serial number information, and a valid bit.

The Segment Jump File Register to receive an entry is selected using the low order 2 bits of the logical level of the Segment Jump instruction. Additionally, direction information is obtained from the storage area (Pool File Register) for the segment that this Segment Jump is in and is used to determine if the Segment Jump is taken or not. If the segment jump is taken, the target address, target segment and target serial number are copied to the selected Segment Jump File Register entry. Additionally, the selected Segment Jump File Register entry valid bit is set. It should be noted that programming rules require that the Segment Jump instruction be placed in the physical program such that when the Segment Jump executes it is already known whether a) its segment is on path or not, and b) the jump will be taken or not. The Death bit is the final indicator on whether this segment is on path, and the bits in the Pool Register are the final indicator on whether the jump is taken or not. This follows since the information associated with the segment jump is recorded only if the segment is on path and the jump is taken.

Process a jump out

Processing a Jump Out instruction requires that, if the Control Transfer Image is empty, the target address, segment number and serial number as well as the logical level and serial number of the jump out instruction be copied to the Control Transfer Image. The Control Transfer Image is a structure used to store information regarding a requested control flow change. That is, during processing of instructions, if an instruction is encountered (e.g. a jump out) which would cause a control flow change (when committed) information concerning that instruction is stored in the Control Transfer Image.

If the Control Transfer Image is not empty then a comparison is performed between the current jump out and the information stored in the Control Transfer Image. The comparison is performed by comparing the logical levels of the current jump out and the stored value of a previously encountered jump out. The jump out having the lower logical level is retained in the Control Transfer Image. If the logical levels are the same, then the serial numbers are compared. The jump out having the lower serial number is retained. If the new jump out "wins" over the current contents of the Control Transfer Image, then the target address, segment number and serial number as well as the logical level of this jump out are copied to the Control Transfer Image. It should be noted that programming rules require that the jump out must be physically placed, during compilation, such that it is known if its segment is on path or not when it executes. This means that the Death Mask is the final indicator of whether the segment is on path or not. The jump out is processed only if it belongs to a segment that is on path of execution.

Process an exception request

During program operation, certain external or internal factors may cause or require an exception. There are two cases encountered when processing an exception request.

A) The logical level of the operation requesting an exception matches the current logical level. In this case, if the Control Transfer Image is empty, the target address, segment number and serial number for the exception as well as the logical level and serial number of this operation are copied to the Control Transfer Image. The exception type is also captured at this point. If the Control Transfer Image is not empty then a comparison is performed between the stored control flow change request and the current exception request. The comparison involves comparing the logical levels with the request having the lower logical level being retained. If the logical levels are the same, then the serial numbers are compared with the request having the lower serial number being retained. If the new operation "wins" over the current content of the Control Transfer Image, then the target address, segment number and serial number for the exception as well as the logical level and serial number of this operation are copied to the Control Transfer Image. Additionally, the exception type is also captured and recorded.

B) The logical level of the operation requesting an exception is not the current logical level. If the Segment Transfer Image for the segment to which the requesting operation belongs is not valid, the serial number of the requesting operation is copied to the Segment Transfer Image for this segment. The exception type is also captured here. If the Segment Transfer Image is valid (i.e. the valid bit is set) then a comparison is performed between the serial numbers of the current exception request and the stored exception request. The exception request with the lower serial number is retained. If the new exception request has a lower serial number then its serial number is copied to the Segment Transfer Image for this segment. Again, the exception type is also captured and stored.

Process an operation commit

Before discussing the process for committing an operation, it should be noted first that an operation commit causes things to happen in the back end logic as well as in the Front End Logic. The discussion of the back end logic considerations on an operation commit will occur separately for convenience. However, an "operation commit in the back end logic" is not a separate process. An operation commit occurs every cycle. The set of instructions to be executed during the cycle carry a commit number. All instructions belonging to the current segment with serial numbers less than or equal to this commit number are to be committed.

In order to process an operation commit, a determination is first made as to whether the operation commit is in the preamble or not. The operation commit is in the preamble if and only if the Preamble Register length is greater than zero. Provided that the Control Transfer Image is not empty, if the Logical level of the Control Transfer Image is equal to the Current Logical Level, then the Serial Numbers are compared. If the Serial Number of the Control Transfer Image is less than or equal to the serial number of this operation commit (i.e. the commit number from the current cycle of instructions), then the transfer of control indicated by the information stored in the Control Transfer Image is performed. This control transfer may be either a jump, exception, or interrupt. These differ primarily in what information is reported to the operating system. If however the operation commit is in the Preamble it is totally ignored.

If a control transfer is taken, then the serial number in the Control Transfer Image minus 1 is sent to the back end logic as the "Commit Number". Additionally, a signal is issued to the back end logic indicating the control transfer. If the control transfer is an exception or interrupt, the trace origin of the top of the tree (i.e. from the Tree Register file 70) is reported to the operating system along with the segment name at the trace origin, the serial number of the excepting operation, and the type of exception. Other steps are performed as well such as setting modes and priorities and interruptability, etc. These other steps are similar to those performed by a conventional processing system during an interrupt or exception process.

In addition to the steps described above, the entire tree is marked undeclared, and "undead". That is, all "declared" bits are set to off and all death bits are set to on. Then, the segment at the top of tree is declared. (See the section on processing a declaration for everything that that occurs in connection with declaring the segment at the top of the tree). The three arguments for this declaration are: the tree location which is set to 00 (i.e., top of tree); the Segment Origin which is copied from the target address of the Control Transfer image; and the Segment Name at the Segment Origin which is copied from the Target Segment of the Control Transfer Image register.

The path and target serial number of the target of the control flow change from the Control Transfer Image are copied to the Preamble Register. The Preamble Register thereby becomes not empty, but its path length could possibly be 0 (however it at least has a serial number). In addition, the four Preamble Segment Jump Registers are set to invalid.

Next, the target address in the Control Transfer Image is copied to the program counter (PC) so that control flows to there (i.e., program execution resumes from the PC value which is set to the target address). The Control Transfer Image is set to empty by resetting the valid bit.

However, if nothing in the Control Transfer Image has been committed, then the only thing that happens is that the serial number of the Operation Commit (i.e. the commit number from the current cycle of instructions) is sent to the back end logic as the "Commit Number".

Process a segment commit

A segment commit occurs when the commit number of a cycle of instructions has the value 255.

It should be first noted that like an operation commit, a segment commit causes things to happen in the back end logic as well as the Front End Logic. This discussion has been separated out for convenience. A "segment commit in the back end logic" is not a separate thing.

First, a determination is made as to whether the Segment Commit is in the Preamble or not. The Segment Commit is in the preamble if the path length of the Preamble Register is greater than 0. There are two possible scenarios:

A). A Segment Commit is in the Preamble. In this case the two low order bits of the Preamble Register Path length are used to select one of the four Preamble Segment Jump Registers. If the register is invalid there will be no jump, and therefore execution continues without taking a branch. That is, the program execution will not transfer to a new PC value which is not sequential to the presently executing instruction. However if the selected Preamble Jump Register is valid then its contents are copied to the PC. Program flow then transfers to the new PC value. In either event the Preamble Register is shifted. That is, the first element, element 0 is lost; each remaining element n moves to position n−1, and the path length of the Preamble Register is shortened by 1. This may result in the path length of the Preamble Register going to 0 which is an acceptable condition.

If the Preamble Segment Jump register is valid, then the target path is prepended on to the Preamble Register. This prepending may possibly extend the length of the Preamble Register B). A Segment Commit is not in the Preamble. The Preamble Register is set to empty (invalid). It should be noted that a Segment Commit is also an Operation Commit. Therefore the process described above, for an Operation Commit which is not in the preamble, is followed. Note that this may or may not result in taking a control transfer. (See discussion on operation commit.) Additionally, in the case that a Control Transfer is not taken then the following is done: A signal indicating "Segment Commit" is sent to the back end logic. The two low order bits of the Current Logical Level are used to select a Segment Jump Register. If the register is valid, then the path and serial number it (the register) contains are copied to the Preamble Register, making it not empty. Also, the target address is copied (from the register) to the PC which will cause control to flow to this location. The selected Segment Jump Register is also set to invalid. At this point the storage area for the current top of the tree is accessed to obtain the direction of the current top of the tree. Using this direction, the tree is shifted. The history register is shifted, inputting the branch direction (L or R) as the last symbol. In addition, the Current Logical Level is incremented. If the new top of the tree is undeclared, then it is declared as described above under "declaring a segment".

The three arguments for this declaration are: the tree location which will be 00 (i.e. top of the tree); the Segment Origin value which will be the Target Address as taken from the selected Segment Jump Register; and the Segment Name at the Segment Origin which will be the Target Segment as taken from the selected Segment Jump Register.

The next step will be to get the pointer to the storage area for the new top of the tree from the tree. If the Segment Transfer Image of this segment is not empty, then the new current logical level will be used as its logical level. If the Control Transfer Image is empty the target address, segment number and serial number for the exception (defined by the exception type), as well as the logical level and serial number of the Segment Transfer Image are copied to the Control Transfer Image. The exception type is also copied from the Segment Transfer Image to the Control Transfer Image.

If on the other hand, the Control Transfer Image is not empty, then the Segment Transfer Image is compared with the Control Transfer Image. As part of the comparison, the logical levels are compared with the lower logical level being the "winner". If the logical levels are the same, then the serial numbers are compared. Here the lower serial number wins. If the new request wins over the current contents of the Control Transfer Image, then the target address, segment number and serial number for the exception (as defined by the exception type) as well as the logical level and serial number of this Segment Transfer Image are copied to the Control Transfer Image. Also the type of the exception is captured as well.

Note that the above discussion includes similar steps as processing an interrupt or exception. The reason for the similarity is that when a segment commits, a new "oldest uncommitted segment" is produced. This is the point at which the exception information, previously stored for each segment, is brought in to the Control Transfer Image since the information is actually about to be used. Remember from the discussion of the exception requests that an exception request that is not for the oldest uncommitted segment is stored in the Segment Transfer Image. If it was from the oldest uncommitted segment, then the associated data was placed directly into the Control Transfer Image. Now, at the segment commit, there is a new oldest uncommitted segment. If there is an exception stored for that segment, it should be copied to the Control Transfer Image. From this point on, if this segment receives any new exception requests, it (the exception request) will be placed directly into the Control Transfer Image. As soon as the commit serial number matches the serial number in the Control Transfer Image, execution will be transferred to an exception handler.

Process a return from interrupt or exception

In order to return from an interrupt or exception, the values of the target address, target segment name and target serial number are first loaded into conventional processor registers. These three values come from the corresponding values that were reported when the interrupt or exception took place (i.e., Trace origin, excepting segment name at its trace origin, and serial number of the excepting operation). However, upon return, the serial number may be modified. The modification would occur if the instruction which caused the exception is not to be repeated upon return from the exception. In this case the serial number is modified (i.e. incremented by one before loading). As a result, execution of instructions starts at the instruction which logically follows the excepting instruction.

Conversely, if the instruction which caused the exception is to be repeated upon return, the serial number as reported when the exception was taken, is loaded and used as the starting point of execution upon return.

The return from interrupt or exception is then executed as any other operation. It executes in the same manner as a jump out instruction except that the data relating to the target address of the return has already been loaded into processor registers rather than being in the instruction and, as in a conventional computer, there are other operations which must be performed on return such as setting modes, priorities, and interruptability. It should be noted that, like other operations (e.g., jump out), control transfer for an exception return actually occurs when the return instruction commits.

Process a LOAD operation

During normal operation, the processor will access the cache system which returns data in conventional fashion. This type of access is typically called a load operation. During cache lookups, any misses automatically cause an access to lower level (i.e., larger slower) caches and finally to main memory in a conventional fashion.

In accordance with the preferred embodiment of the present invention, store operations do not alter any data in the caches immediately. Caches are updated with data from store operations at the same time that these stores are released to update memory as will be discussed below. it should be noted however that other cache implementations may be used with the present invention.

In response to a load operation, its physical address, corrected segment name (path), logical level, serial number, and segment storage area pointer are transmitted to the back end logic. Additionally, a subset of the physical address bits are compared with an associated subset of bits of all physical addresses of all stores currently in the Write Buffer. For each match, the following is done:

A full address and operand size compare for overlap. Only stores in which there really is data overlap with the load are retained.

A compare of the logical level and serial number of the load with logical level and serial number of stores having address matches. Only the matches in which the store logically precedes the load are retained.

The segment names (paths) of the matching stores are updated (using a procedure discussed previously). They are compared with the load. Stores not on the path to the load are ignored. Additionally they are checked against the death mask. Any matching stores that are marked as dead are ignored.

If any stores remain that match this load and have passed the described above filtering, then a so called "Memory Collision" exception for the load operation is requested. Otherwise, information about this load is entered into Read Buffer. That is, the physical address of the load, its segment name (path), logical level, and serial number, and data size are recorded.

Process a STORE operation

In response to a store operation, the physical address of the store, the data to be stored, data size, the corrected segment name (path), logical level, serial number, and segment storage area pointer are transmitted to the back end logic. All of this data is recorded in the "Write Buffer". In a similar fashion as for the load operation, a subset of the physical address bits of the store operation are compared with an associated subset of bits of all physical addresses of all loads in the Read Buffer. For each match, the following is done:

- A full address and operand size compare for overlap. Only loads in which there really is data overlap with the store are retained.
- A compare of the logical level and serial number of the store with logical level and serial number of matching loads. Only the matches in which the store logically precedes the load are retained.
- The updated paths are compared to determine if the load is on the path to the store. If the load is not on path, it is ignored.

If any loads remain that match this store and have passed the above described filtering, then a "Memory Collision" exception (described below) is requested for each such load. Because of the way exceptions work, as discussed above, at most one exception will actually be taken. The exception taken will be the one associated with the logically earliest load that is on the true path of execution (provided there is no logically earlier control flow change). Hence it would be adequate to request only one exception for the logically earliest offending load instruction.

Process an operation commit in the C-Box

When any operation commits, each entry in the Read Buffer with a logical level equal to the current logical level (stored in the Logical Level Register (FIG. 5)) and a serial number equal to or less than the commit serial number, is effectively removed (e.g., marked invalid). All entries in the Write Buffer, with segment names matching the segment name currently stored at the top of the Tree, and with serial numbers less than or equal to the commit serial number are released to memory. As a result, these entries update caches and effectively go into memory in order by serial number.

Whether data actually goes to memory or not depends on the chosen cache design for the system. If the system uses a write back cache, then updating the cache effectively represents putting the data in memory. When such entries have effectively been put in cache and memory, they are removed from the write buffer.

It should be noted that if there is a control flow change, then only write buffer entries up to the serial number of the last logically completed operation are written to cache and memory. Entries with higher serial numbers are ignored. If there is a control flow change, after the proper write buffer entries go to cache and memory, then the entire read buffer and the entire write buffer are emptied.

Process a segment commit in C-Box

As a general matter, a segment commit is equivalent to an operation commit, so everything described under operation commit is done. Among other things, this means that all writes in the write buffer for the committing segment go to cache and memory in serial number order. In a simple model of the C-Box there isn't much else that happens. In the preferred embodiment, the design is set up to release the storage area to free space as soon as all of the writes from the committing segment have been transferred to a sort buffer (not shown).

Process a memory Collision Exception

When a Memory Collision Exception, is actually taken (i.e., committed), the only thing required is a standard return from interrupt or exception as described above. There is nothing in addition to the standard return that needs to be performed. The act of taking the exception and returning should rectify the collision problem.

A collision exception is always requested on a load operation that does not receive the correct data. As part of the operation commits that lead to actually taking this Memory Collision exception, memory was brought up to date with all operations logically preceding, except the load being completed and all operations logically after the excepting load not done. In the exception, the excepting load is identified as the logically earliest operation that is not complete. Processing returns to that operation which now executes with memory correct. At this point, the load should receive the correct data.

Having described a preferred embodiment of the invention, it will now become apparent, to one of skill in the art that other embodiments incorporating its concepts may be used. It is felt therefore, that this invention should not be limited to the disclosed embodiment, but rather should be limited only by the spirit and scope of the appended claims.

What is claimed is:

1. A method executed in a computer system which includes a central processing unit and a memory, the method comprising the steps of:

building a physical program for execution by said central processing unit, said physical program including a plurality of computer instructions arranged according to a method including the steps of:

adding a first type of information to a set of linearly dependent computer instructions, said set of linearly dependent computer instructions having a tree structure comprising one or more segments, each of said segments of said tree structure including a plurality of said set of linearly dependent computer instructions, said segments connected by nodes representing decisional instructions, said first type of information corresponding to a serial number associated with an order in which said linearly dependent computer instructions are arranged within each of said segments;

rearranging said set of linearly dependent computer instructions into a set of non-linearly dependent computer instructions with said added information allowing reconstruction of said set of linearly dependent computer instructions having said tree structure from said physical program; and responsive to performing said rearranging step, adding commit information to each of said set of non-linearly dependent computer instructions identifying where said each non-linearly dependent computer instruction commits; and executing a plurality of said computer instructions of said physical program simultaneously by using said first type of information and said commit information during runtime to enable execution of said physical program to produce execution behavior equivalent to executing said set of linearly dependent computer instructions.

2. The method of claim 1, wherein said step of adding a first type of information includes assigning a serial number to each instruction in each of said sets of linearly dependent instructions; and wherein the second adding step includes assigning path codes to groups of said rearranged instructions, said path codes corresponding to a path through said tree structure which identifies a particular one of said segments in which said group of instructions will be committed.

3. The method of claim 2, wherein said step of executing further comprises the steps of:
- simultaneously loading a plurality of said physical program instructions into a plurality of execution means;
- determining if any of said plurality of computer instructions is a deviant instruction attempting to cause said computer system to execute a portion of said plurality of computer instructions in a manner which deviates from sequential execution order of said linearly dependent computer instructions; and
- recording information concerning said deviant instruction to allow subsequent execution of said portion of computer instructions executed out of said sequential execution order.

4. The method of claim 2, wherein said computer system executes read operations and write operations, said method further comprising the steps of:
- storing information corresponding to each read operation in a read buffer;
- comparing each write operation to each entry in the read buffer;
- storing information corresponding to each write operation in a write buffer; and
- comparing each read operation to each entry in the write buffer.

5. The method of claim 2, wherein said path codes include bit patterns indicating a path to follow through said tree structure when execution of said physical program reaches one of said nodes.

6. The method of claim 4, wherein said read buffer includes a read address of a read operation instruction identifying a first location in said memory from which data is loaded, said write buffer includes a write address of a write operation instruction identifying a second location in said memory to which data is stored, said read operation instruction and said write operation instruction belonging to said set of non-linearly dependent computer instructions, and the method further includes the steps of:
- determining, in response to said step of comparing each read operation to each entry in the write buffer, if there is an address match in which said first and second locations refer to the same memory address;
- for each address match, determining if said write operation instruction logically precedes said read operation instruction by comparing a first serial number and a first path code associated with said read operation instruction to a second serial number and second path code associated with said write operation instruction; and
- generating a memory ordering exception signal responsive to both determining an address match and determining that said write operation instruction logically precedes said read operation instruction.

7. The method of claim 4, wherein a write operation being recorded in the write buffer indicates that data associated with write operation has not yet been written to cache or said memory.

8. The method of claim 4, wherein each of said instructions included in said set of non-linearly dependent computer instructions includes a commit number indicating how far execution has logically completed in said set of linearly dependent computer instructions, and the read buffer is flushed by performing the following steps for each entry in said read buffer:
- comparing a commit number of a committed instruction to a serial number corresponding to said each entry in the read buffer for a read operation instruction; and
- deleting said each entry, responsive to said step of comparing a commit number to a serial number, if said serial number corresponding to said each entry precedes or is equal to said commit number.

9. A computer system comprising:
- means for providing a second set of computer instructions from a first set of computer instructions, said first set of computer instructions being arranged in a linearly dependent order and having a tree structure where segments of said tree structure include a plurality of said computer instructions in which said segments are connected by nodes which represent decisional instructions, said second set of computer instructions being a non-linearly dependent rearrangement of said first set of computer instructions, each computer instruction included in said second set being associated with information enabling reconstruction of said first set of computer instructions from said second set of computer instructions; and
- means for simultaneously executing a plurality of said second set of computer instructions, said executing means providing execution results which are equivalent to together execution results provided by executing said first set of computer instructions in a linear dependent order by using at execution time said information enabling reconstruction.

10. The computer system of claim 9, wherein said means for executing said plurality of a second set of computer instructions includes:
- a plurality of execution means;
- an instruction issuing means coupled to said plurality of execution means, said instruction issuing means providing computer instructions to each of said execution means within the same computer processing cycle;
- an instruction control means for monitoring said plurality of computer instructions to determine if any one of said plurality of instructions is attempting to execute an interrupt or exception type instruction and for analyzing commit information associated with said plurality of computer instructions to determine if said plurality of computer instructions has committed, said commit information including path codes identifying a path through said tree structure to a particular one of said segments in which said plurality of computer instructions will commit; and
- means for reordering memory reference instructions executed out of correct linear order to provide execution of said memory reference instructions in said correct linear order.

11. The computer system of claim 10, wherein said instruction control means further comprises a plurality of registers for storing information regarding said computer instructions which attempt to cause deviation from sequential execution of said first set of computer instructions.

12. The computer system of claim 10, wherein said means for reordering memory reference instructions includes means for storing information corresponding to a plurality of read operations and write operations to a memory; and
- means for comparing each memory reference instructions to each entry in said storing means, said comparing means determining out of order memory references by comparing commit information associated with said read operations and said write operations.

13. The computer system of claim 9, wherein each of said second set of computer instructions includes:
- a serial number associated with each instruction in said second set of computer instructions and corresponding to said linear arrangement within each of said segments of said first set of computer instructions.

14. A computer system comprising:

means for issuing a plurality of instructions during a common processing cycle, said plurality of instructions being a non-linearly dependent rearrangement of a set of linearly dependent instructions having a tree structure where segments of said tree structure contain a plurality of said set of linearly dependent instructions and where said segments are connected by nodes representing decisional instructions, each of said rearranged instructions including a serial number which indicates the instruction's linear sequential order within one of said segments;

means for analyzing said issued instructions to determine if any one of said issued instructions is attempting to cause execution to deviate from said linear sequential order;

a plurality of execution units for executing during another common processor cycle at least two of said plurality of instructions; and means for reordering memory reference instructions executed out of correct linear order to provide execution of said memory reference instructions in said correct linear order.

15. The computer system of claim 14, wherein said plurality of instructions further includes commit information appended to subsets of said plurality of instructions, said commit information identifying where during logical program execution of said linearly dependent instructions each of said plurality of instructions commits;

wherein said analyzing means operates in response to values associated with said serial numbers and said commit information to detect when a particular one of said plurality of instructions is attempting to cause deviation from said linear sequential order; and wherein said means for reordering operates in response to values associated with said serial numbers and said commit information to reorder said memory reference instructions executed out of said correct linear order to provide execution of said memory reference instructions in said correct linear order.

16. The computer system of claim 15, wherein said commit information includes path codes appended to said subsets of instructions and where said path codes indicate a path through said tree structure to a particular one of said segments where said subset of instructions will commit.

17. A computer processor for executing a physical program constructed from a first set of linearly dependent computer instructions having a tree structure where segments of said tree structure include a plurality of said computer instructions and where said segments are connected by nodes which represent decisional computer instructions, said physical program being a second set of computer instructions representing a non-linearly dependent rearrangement of said first set of computer instructions, the computer processor comprising:

an instruction cache for issuing a plurality of said second set of computer instructions during a common processing cycle, each computer instruction including a serial number which indicates the computer instruction's linear sequential order within one of said segments;

an instruction monitor for monitoring said plurality of computer instructions using information associated with said each computer instruction to determine if any one of said plurality of computer instructions is attempting to cause execution to deviate from said linear sequential order, said information including said serial number associated with said each computer instruction;

a plurality of execution units for executing during another common processor cycle at least two of said plurality of computer instructions; and a memory buffer for reordering memory reference instructions executed out of correct linear order to provide execution of said memory reference instructions in said correct linear order.

18. The computer processor of claim 17, wherein said information associated with said each of said plurality of computer instructions further includes path codes, each of said path codes being associated with said particular one of said computer instructions and identifying a path through said tree structure to a particular one of said segments in which said particular computer instruction will commit;

wherein said instruction monitor operates in response to values associated with said serial numbers and said path codes to detect when a particular one of said plurality of computer instructions is attempting to cause execution which deviates from said linear sequential order; and wherein said memory buffer operates in response to values associated with said serial numbers and said path codes to reorder said memory reference instructions executed out of correct linear order to provide execution of said memory reference instructions in said correct linear order.

19. The computer processor of claim 17, wherein said plurality of computer instructions include one or more read memory reference instructions loading data from memory and one or more write memory reference instructions storing data to memory, add said memory buffer further comprises:

a read buffer for storing information regarding each read memory reference instruction;

a write buffer for storing information regarding each write memory reference instruction;

a first compare unit for comparing each of said read memory reference instructions to every entry in said write buffer;

a second compare unit for comparing each of said write memory reference instructions to every entry in said read buffer; and an exception signal generator for providing a signal, in response to an output from either said first or said second compare units, to indicate that a memory reference instruction is attempting to be executed out of correct linear order.

20. The computer processor of claim 17, wherein said instruction monitor includes a plurality of registers for storing information regarding a particular computer instruction from said plurality of computer instructions which is attempting to cause execution deviating from said linear sequential order.

* * * * *